US008120479B2

(12) United States Patent
Arie et al.

(10) Patent No.: US 8,120,479 B2

(45) Date of Patent: Feb. 21, 2012

(54) VEHICULAR INSTRUMENT DEVICE AND VEHICLE WITH VEHICULAR INSTRUMENT DEVICE

(75) Inventors: Kenichi Arie, Utsunomiya (JP); Kazuhiro Hasunuma, Utsunomiya (JP); Naoki Wada, Utsunomiya (JP); Masahide Kobayashi, Tokyo (JP); Hidetoshi Kabayama, Tokyo (JP); Makoto Koike, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/049,698

(22) Filed: Mar. 16, 2011

(65) Prior Publication Data

US 2011/0163867 A1 Jul. 7, 2011

Related U.S. Application Data

(62) Division of application No. 12/065,187, filed as application No. PCT/JP2006/317416 on Aug. 29, 2006, now Pat. No. 7,932,819.

(30) Foreign Application Priority Data

Aug. 30, 2005 (JP) ................................ 2005 250042
Aug. 30, 2005 (JP) ................................ 2005-250043

(51) Int. Cl.
*B60Q 1/00* (2006.01)

(52) U.S. Cl. ........ 340/461; 340/438; 340/439; 340/441; 340/425.5

(58) Field of Classification Search .................. 340/461, 340/462, 425.5, 439, 441, 901, 438; 345/1.1, 345/7, 9, 23, 26, 27, 29
See application file for complete search history.

(56) References Cited

U.S. PATENT DOCUMENTS

| | | | |
|---|---|---|---|
| 6,181,301 B1 | 1/2001 | Inoguchi et al. | |
| 6,317,110 B1 | 11/2001 | Brandt | |
| 6,373,400 B1 | 4/2002 | Fujita et al. | |
| 6,522,381 B1 | 2/2003 | Brandt | |
| 6,995,661 B2 | 2/2006 | Amari | |
| 2002/0158448 A1 | 10/2002 | Okonkwo | |
| 2003/0098932 A1 | 5/2003 | Brandt | |
| 2005/0280514 A1* | 12/2005 | Doan | 340/425.5 |
| 2007/0279243 A1 | 12/2007 | Araki et al. | |

FOREIGN PATENT DOCUMENTS

| | | |
|---|---|---|
| DE | 35 16 404 A1 | 10/1985 |
| DE | 42 18 804 A1 | 12/1993 |
| DE | 43 07 367 A1 | 9/1994 |

(Continued)

*Primary Examiner* — Hung T. Nguyen
(74) *Attorney, Agent, or Firm* — Arent Fox LLP

(57) ABSTRACT

A vehicular display device that includes a transmissive first liquid crystal display unit having a plurality of display elements; a transmissive second liquid crystal display unit superposed on the first liquid crystal display unit and having a plurality of display elements; and a controller for controlling the display elements of the first second liquid crystal display units, so as to display information required by a driver of the vehicle. The information displayed by the display elements includes at least first information indicative of a status of the vehicle, second information for confirming an operating setting of a vehicle-mounted device on the vehicle, and third information for indication to the driver. The controller controls the display elements to selectively display the information by selectively energizing and de-energizing the display elements, and further controls the display elements to simultaneously display the information in a non-overlapping manner.

4 Claims, 12 Drawing Sheets

126 124 122 118b 128 km/h km/h

FOREIGN PATENT DOCUMENTS

| | | | |
|---|---|---|---|
| EP | 0 959 452 | A2 | 5/1999 |
| JP | 63-202530 | U | 12/1988 |
| JP | 64-051535 | U | 3/1989 |
| JP | 05-181104 | A | 7/1993 |
| JP | 07-156687 | A | 6/1995 |
| JP | 08-185133 | A | 7/1996 |
| JP | 11-352943 | A | 12/1999 |
| JP | 2000-108722 | A | 4/2000 |
| JP | 2000-168400 | A | 6/2000 |
| JP | 2002-067735 | A | 3/2002 |
| JP | 2002-225592 | A | 8/2002 |
| JP | 2002-229059 | A | 8/2002 |
| JP | 2003-345334 | A | 12/2003 |
| WO | WO 99/23624 | A1 | 5/1999 |

* cited by examiner

X1
X2
MOVEMENT OF LINE OF SIGHT
10
11
12
14
16
18
19
21
37
40
42
44
45
46
47
48
49

FIG. 4

| DISPLAY ITEMS | VISUALLY RECOGNIZED FREQUENCY [%] |
|---|---|
| SPEEDOMETER | 64 |
| TACHOMETER | 15 |
| AT INDICATOR | 2 |
| PARKING INDICATOR | 1 |
| FUEL GAGE | 5 |
| COOLANT TEMPERATURE GAGE | 1 |
| ODOMETER AND TRIP METER | 10 |
| TURN INDICATOR | 1 |

44
58
49
66
56
16
10
48 (19)
45
17
18
21
12
MOVEMENT OF
LINE OF SIGHT
39

58
44
56
49
60
62
45
48 (19)
16
10
17
18
21
12
MOVEMENT OF
LINE OF SIGHT 110
112
114
116
XI
XI
km/h
143
144
146
148
150
152
154
0 1 2 3 4 5 6 7 8
R N D 2 1
10693
38°C

VEHICULAR INSTRUMENT DEVICE AND VEHICLE WITH VEHICULAR INSTRUMENT DEVICE

CROSS-REFERENCE TO RELATED APPLICATION

This application is a division of U.S. application Ser. No. 12/065,187, filed Aug. 8, 2008, now U.S. Pat. No. 7,932,819, which is a National Stage entry of International Application No. PCT/JP2006/317416, filed Aug. 29, 2006, the entire specifications claims and drawings of which are incorporated herewith by reference.

TECHNICAL FIELD

The present invention relates to a vehicular instrument device having first and second meter cluster panels, which are disposed in an instrumental panel, and to a vehicle incorporating such a vehicular instrument device.

The present invention is also concerned with a vehicular display device having a first liquid crystal display unit, a second liquid crystal display unit superposed on the first liquid crystal display unit, and a controller for controlling the first and second liquid crystal display units so as to display information, and to a vehicle incorporating such a vehicular display device.

BACKGROUND ART

Vehicular instrument devices, which allow a vehicle driver to visually recognize information necessary to drive the vehicle by means of two instruments disposed in the instrument panel, are disclosed in Japanese Laid-Open Patent Publication No. 2000-168400 and Japanese Laid-Open Patent Publication No. 2002-67735.

Specifically, in the vehicular instrument device disclosed in Japanese Laid-Open Patent Publication No. 2000-168400, one of the instruments, which displays less urgent information such as information about parking lots, etc., is positioned in a substantially central area of the instrument panel, when the driver directs his or her line of sight toward the forward direction of the vehicle, and the other instrument, which displays more urgent information such as information about vehicle speed, route guidance for the vehicle and road traffic, is positioned in an area of the instrument panel that is closer to the steering wheel than the central area thereof.

In the vehicular instrument device disclosed in Japanese Laid-Open Patent Publication No. 2002-67735, one of the instruments, which displays more frequently viewed information such as information about vehicle speed and engine speed, is positioned in a substantially central area of the instrument panel, when the driver directs his or her line of sight toward the forward direction of the vehicle, and the other instrument, which displays less frequently viewed information such as information about brake malfunctions and battery charging failures, is positioned in an area of the instrument panel that is viewed inside the steering wheel.

Another vehicular instrument device disclosed in Japanese Laid-Open Patent Publication No. 2002-225592 has an instrument and a head-up display. The instrument displays information, the importance of which does not change even when the vehicle situation changes, such as information about vehicle speed and fuel level, which is positioned in a substantially central area of the instrument panel, or in an area of the instrument panel that is viewed inside the steering wheel when the driver directs his or her line of sight in the forward direction of the vehicle. The head-up display displays information of greater importance, such as warnings for preventing vehicle collisions, in an area of the front windshield near the instrument panel.

While the driver is driving the vehicle, the driver directs his or her line of sight through the front windshield toward an outside area in the forward direction of the vehicle. At this time, the driver's view covers a certain angular range around the line of sight, including the front windshield and a portion of the instrument panel.

With the vehicular display devices disclosed in the above publications, when the driver directs his or her line of sight in the forward direction of the vehicle, for example, the display area of the instrument that displays vehicle speed, which is important and viewed quite frequently by the driver, is viewed either (1) in a substantially central area of the instrument panel located outside of the steering wheel (Japanese Laid-Open Patent Publication No. 2000-168400, Japanese Laid-Open Patent Publication No. 2002-67735, and Japanese Laid-Open Patent Publication No. 2002-225592), or (2) in an area of the instrument panel located inside the steering wheel (Japanese Laid-Open Patent Publication No. 2002-225592).

In order to observe the displayed vehicle speed, the driver must move his or her head vertically and horizontally about the neck, in order to move the line of sight from the exterior area toward the display area of the instrument. If the display area of the instrument is viewed in a substantially central area of the instrument panel, then since the line of sight moves a greater distance horizontally than vertically, movement of the line of sight also requires a longer period of time when moving horizontally than when moving vertically. If the display area of the instrument is viewed in the area of the instrument panel inside the steering wheel, then the driver must move his or her line of sight by a large vertical distance.

Japanese Laid-Open Patent Publication No. 11-352943 and Japanese Laid-Open Patent Publication No. 2000-108722 disclose vehicular display devices having a first liquid crystal display unit, and a second liquid crystal display unit superposed on the first liquid crystal display unit. The first and second liquid crystal display units display information about vehicle speed, etc., for the driver to visually recognize.

In the vehicular display device disclosed in Japanese Laid-Open Patent Publication No. 11-352943, the first liquid crystal display unit displays vehicle speed, while the second liquid crystal display unit superposed on the first liquid crystal display unit displays vehicle speed in a superposed relation to the vehicle speed displayed by the first liquid crystal display unit. In the vehicular display device disclosed in Japanese Laid-Open Patent Publication No. 2000-108722, the first liquid crystal display unit displays route guidance information for the driver as well as the temperature outside of the vehicle, while the second liquid crystal display unit superposed on the first liquid crystal display unit forms a speedometer, comprising an arcuate array of display segments simulating an analog pointer, for displaying vehicle speed.

With the above vehicular display devices, various items of information required by the driver must be displayed by a plurality of display elements, which are disposed in the first liquid crystal display unit and the second liquid crystal display unit respectively.

The vehicular display devices of Japanese Laid-Open Patent Publication No. 11-352943 and Japanese Laid-Open Patent Publication No. 2000-108722 simultaneously display many items of information through the display elements. For allowing the driver to visually recognize such various items of information, the liquid crystal display units must be large in size and contain many display elements. As a result, each time the various items of information are displayed, the driver needs to move his or her line of sight in order to view the displayed information.

SUMMARY OF INVENTION

It is an object of the present invention to provide a vehicular instrument device, which reduces movement of the line of sight of the driver, as well as a vehicle incorporating such a vehicular instrument device. A further object of the present invention is to provide a vehicular display device, as well as a vehicle incorporating such a vehicular display device.

According to an aspect of the present invention, the vehicular instrument device comprises a first meter cluster panel for displaying information that is visually recognizable within a predetermined angular field of vision outside of a steering wheel of the vehicle, when a driver of the vehicle directs a line of sight in a forward direction of the vehicle from an eye range of the driver, and a second meter cluster panel for displaying information that is visually recognizable within the predetermined angular field of vision inside the steering wheel, the first meter cluster panel and the second meter cluster panel being disposed on an instrument panel of the vehicle, wherein the first meter cluster panel is included in the instrument panel near a boundary line between the instrument panel and a front windshield of the vehicle, at a position deeper than the second meter cluster panel as viewed from the perspective of the driver, and wherein the first meter cluster panel and the second meter cluster panel have respective centers of display, the center of display of the first meter cluster panel and the center of display of the second meter cluster panel being aligned along a longitudinal direction of the vehicle.

With the above arrangement, since the center of display of the first meter cluster panel and the center of display of the second meter cluster panel are disposed coaxially in the longitudinal direction of the vehicle, the driver is required to move his or her line of sight only vertically. Since the first meter cluster panel is disposed near the boundary line, at a position deeper than the second meter cluster panel as viewed from the perspective of the driver, and the information displayed by the first meter cluster panel is visually recognized outside of the steering wheel, the driver directing his or her line of sight toward an exterior area outside of the vehicle in the forward direction through the front windshield finds it easy to focus on the information displayed by the first meter cluster panel. According to the present invention, the movement of the line of sight of the driver is smaller than with conventional vehicular instrument devices. The center of display of the first meter cluster panel refers to the center of a display surface of the first meter cluster panel, and the center of display of the second meter cluster panel refers to the center of a display surface of the second meter cluster panel.

Preferably, the vehicle has an axis passing through the center of display of the first meter cluster panel and an axis passing through the center of display of the second meter cluster panel, and the steering wheel is steerable by the driver and supported by a steering shaft having a central axis, wherein the axes of the vehicle and the central axis of the steering shaft are substantially parallel to each other when viewed from above. In particular, the vehicle has a seat on which the driver is seated, the seat having a seat center, wherein the seat center, the central axis of the steering shaft, the center of display of the first meter cluster panel and the center of display of the second meter cluster panel are aligned along a longitudinal direction of the vehicle. The driver can therefore drive the vehicle in a natural driving posture, and movement of the line of sight of the driver can further be reduced. The seat center refers to the center of the seat on which the driver is seated.

The first meter cluster panel and the second meter cluster panel display information of high and low visually recognized frequencies, which is classified based on the frequency at which such information is visually recognized by the driver while the driver operates the vehicle. Preferably, the first meter cluster panel displays information of high visually recognized frequency. Information of high visually recognized frequency, which is displayed by the first meter cluster panel, comprises at least vehicle speed, wherein the first meter cluster panel displays the vehicle speed digitally. The driver can thus visually recognize vehicle speed in a short period of time.

Preferably, the first meter cluster panel has a display surface having an upper end, which is shaped along an image of the steering wheel, as projected from the eye range onto the instrument panel. More preferably, the first meter cluster panel has a display surface having a vertical height which is smaller than the vertical height of a display surface of the second meter cluster panel. Therefore, the driver obtains a maximum field of vision with respect to the exterior area outside the vehicle.

According to another aspect of the present invention, a vehicular display device is provided, comprising a transmissive first liquid crystal display unit having a plurality of display elements, a transmissive second liquid crystal display unit superposed on the first liquid crystal display unit and having a plurality of display elements, and a controller for controlling the display elements of the first liquid crystal display unit and the display elements of the second liquid crystal display unit, so as to display information required by the driver, wherein the information displayed by the display elements comprises at least first information indicative of a status of the vehicle, second information for confirming an operating setting of a vehicle-mounted device, and third information for indication to the driver, wherein the controller controls the display elements to selectively display the information by selectively energizing and de-energizing the display elements, and further controls the display elements to simultaneously display the information in a non-overlapping manner.

With the above arrangement, the first information, and the second information or the third information, can be simultaneously displayed without overlapping each other. Even when various items of information are displayed, the line of sight of the driver is moved only a relatively small distance.

The first information comprises information indicative of a status of the vehicle, such as vehicle speed. The second information comprises information for confirming operational settings of a vehicle-mounted device (i.e., whether the vehicle-mounted device is in operation or not) that controls the vehicle so as to cruise while keeping a predetermined distance between the vehicle and a preceding vehicle. The third information comprises information indicating to the driver that the vehicle is approaching the preceding vehicle.

The display element of the first liquid crystal display unit and the display element of the second liquid crystal display unit have respective different sizes for displaying the first information. While the first information is being displayed by the display element of either one of the first liquid crystal display unit and the second liquid crystal display unit, when the second information or the third information is displayed by the display element of the other one of the first liquid crystal display unit and the second liquid crystal display unit, the controller controls the display elements so as to display the first information on the display element of the other liquid crystal display unit, wherein the display element of the other liquid crystal display unit for displaying the first information is smaller in size than the display element of the one liquid crystal display unit for displaying the first information. With this arrangement, the display elements can be arranged in the first and second liquid crystal display units, in order to display the first, second, and third information, without increasing the liquid crystal display sizes of the first liquid crystal display unit and the second liquid crystal display unit.

When the first information, and the second information or the third information, are simultaneously displayed by the first liquid crystal display unit and the second liquid crystal display unit, the controller preferably controls the display elements to display the information next to each other, as viewed by the driver. Thus, the movement of the line of sight of the driver can further be reduced.

The vehicular instrument device and the vehicular display device, as described above, can be incorporated in a vehicle.

Any of the vehicular instrument device, the vehicle incorporating the vehicular instrument device therein, the vehicular display device, and the vehicle incorporating the vehicular display device therein, is effective at reducing movement of the line of sight of the driver.

The above and other objects, features, and advantages of the present invention shall become more apparent from the following descriptions, when taken in conjunction with the accompanying drawings in which preferred embodiments of the present invention are shown by way of illustrative example.

BRIEF DESCRIPTION OF DRAWINGS

FIG. 4 is a table showing a relationship between items of information required by the driver and respective frequencies at which the items of information are viewed;

BEST MODE FOR CARRYING OUT THE INVENTION

A vehicular instrument device 10 according to an embodiment of the present invention, and a vehicle 11 incorporating the vehicular instrument device 10, shall first be described below with reference to FIGS. 1 through 8.

Figure 1:
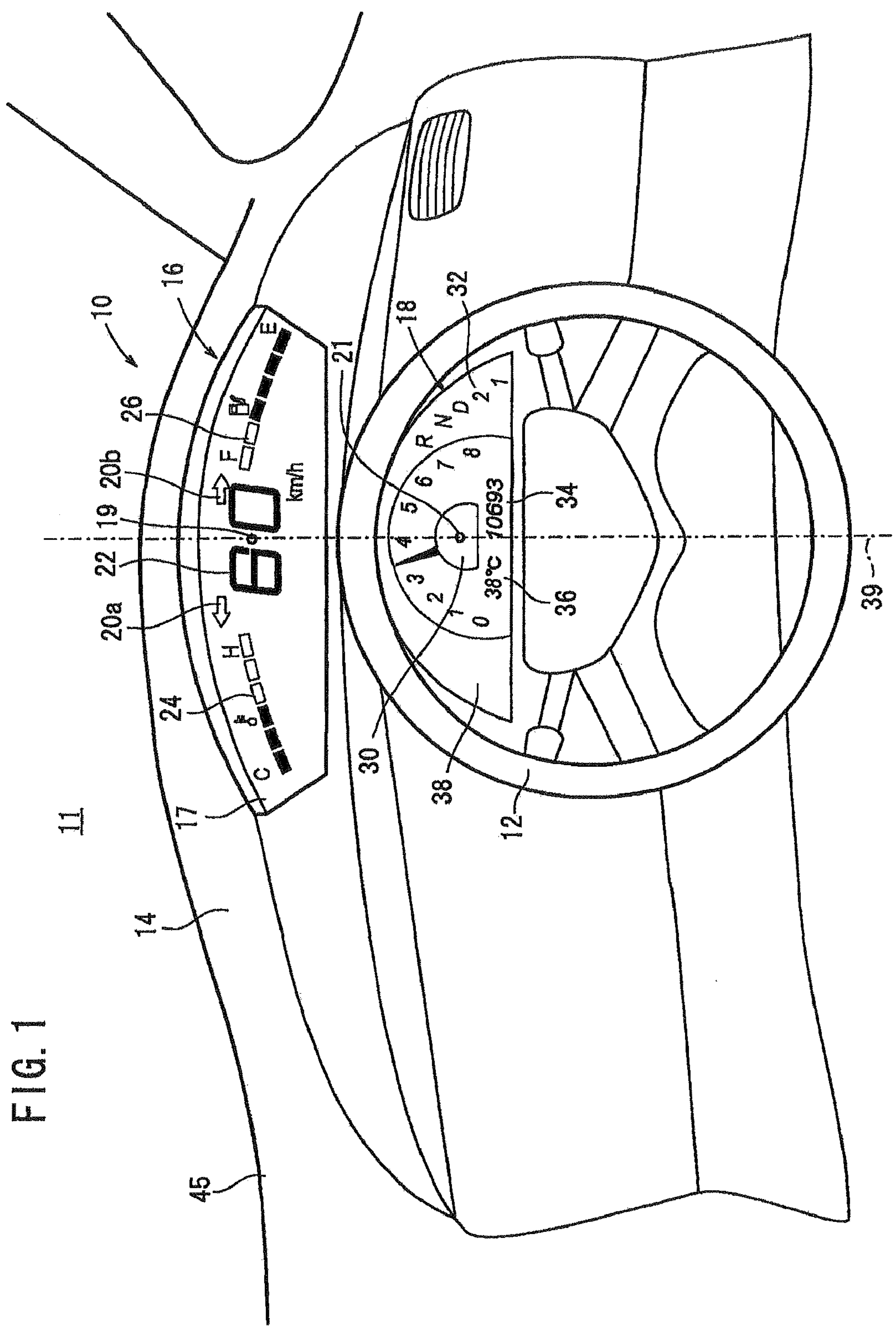
FIG. 1 is a front elevational view of a vehicular instrument device according to an embodiment of the present invention.
Figure 2:
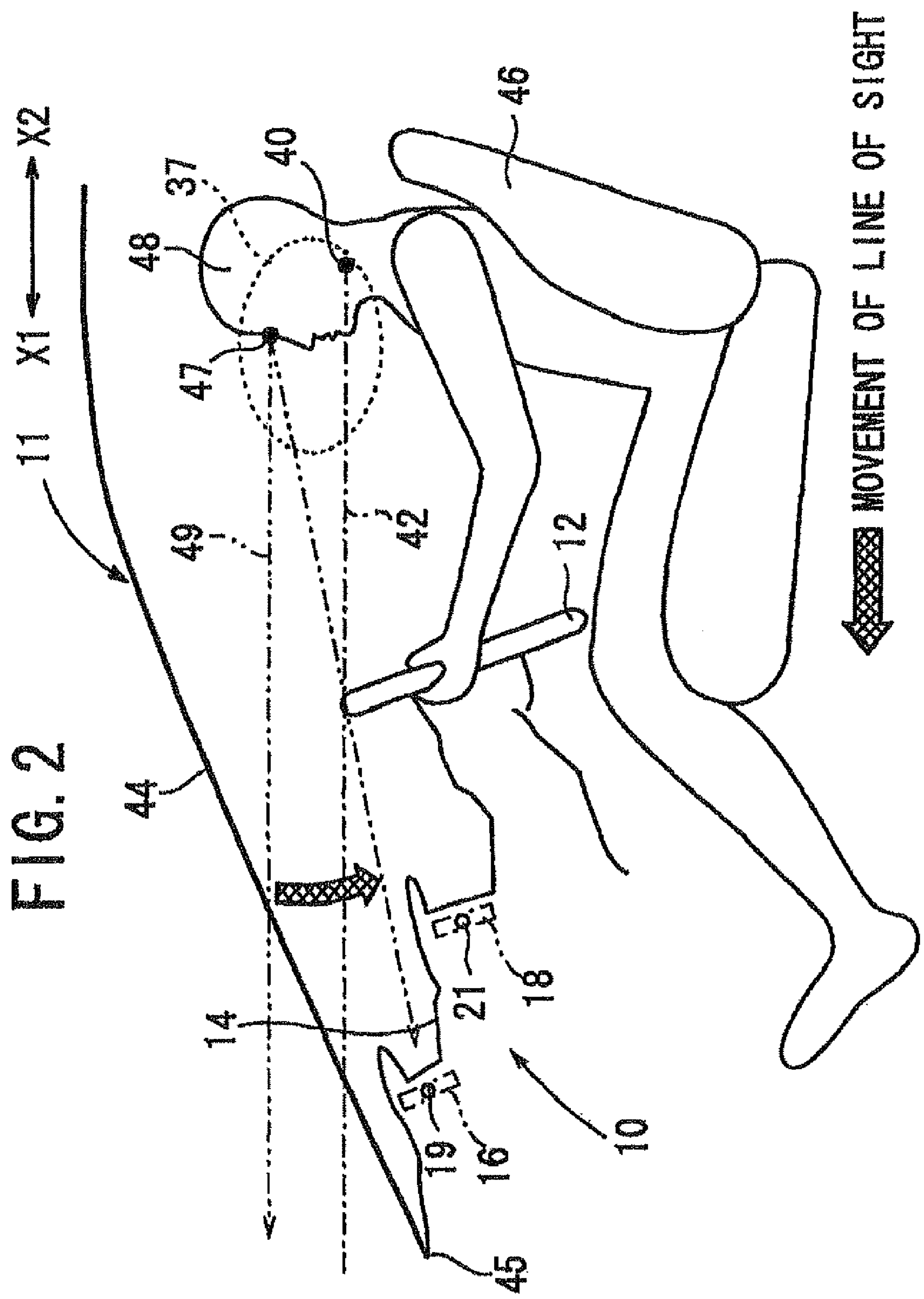
FIG. 2 is a side elevational view showing a layout of the vehicular instrument device shown in FIG. 1.
Figure 3:
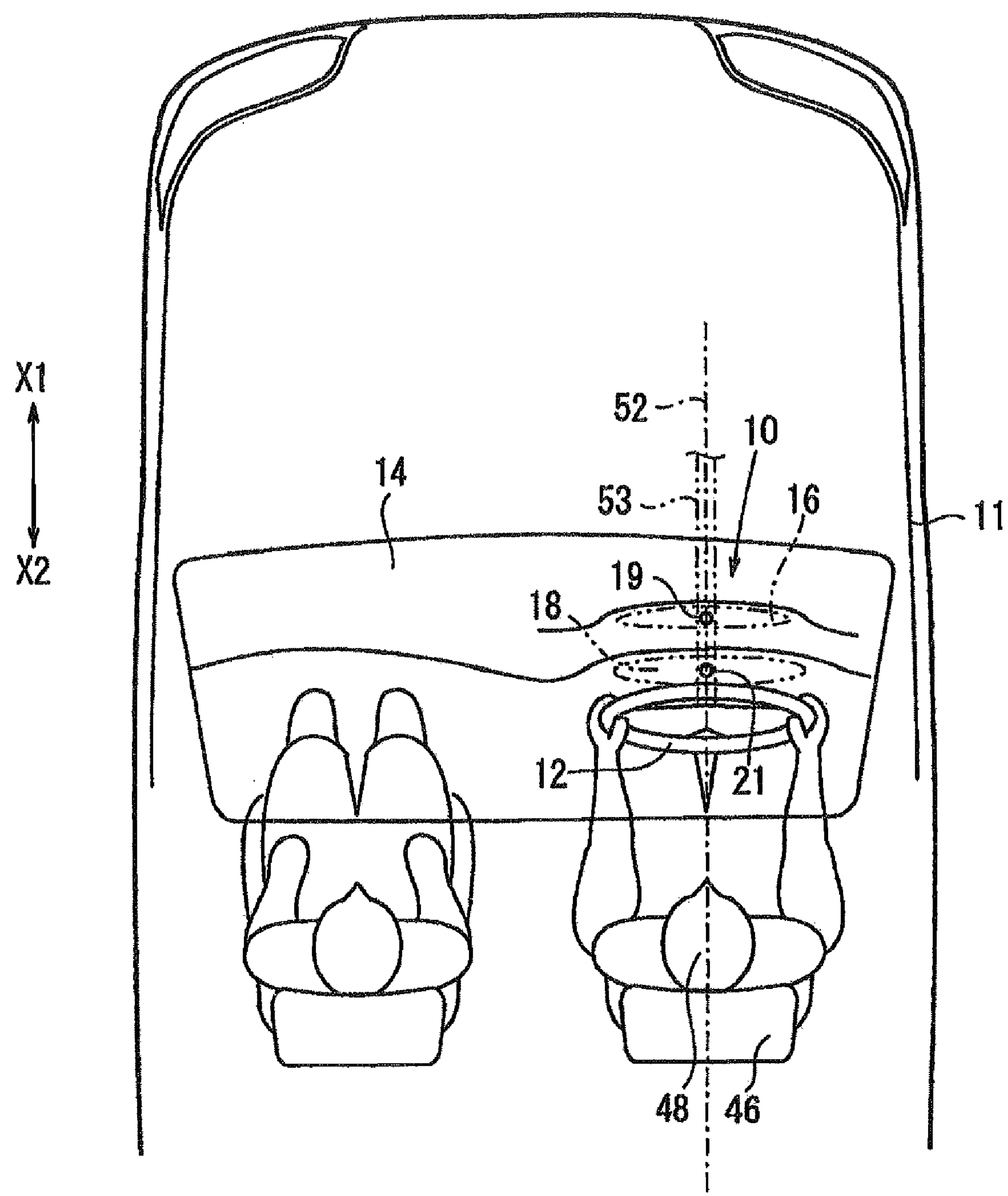
FIG. 3 is a plan view showing the layout of the vehicular instrument device shown in FIG. 1.

FIG. 1 shows, in front elevation, the vehicular instrument device 10, which is incorporated in the vehicle 11 according to the embodiment of the present invention. FIG. 2 shows a side elevation of the vehicle 11, illustrating the layout of a first meter cluster panel 16 and a second meter cluster panel 18 of the vehicular instrument device 10. FIG. 3 shows a plan view of the vehicle 11, illustrating the layout of a steering wheel 12, the first meter cluster panel 16, and the second meter cluster panel 18.

As shown in FIGS. 1 through 3, the first meter cluster panel 16 and the second meter cluster panel 18 are disposed in an instrument panel 14.

As shown in FIG. 1, the first meter cluster panel 16 is an instrument for displaying various items of information digitally. The first meter cluster panel 16 includes a speedometer 22 for displaying vehicle speed of the vehicle 11, a coolant temperature gauge 24 for displaying temperature of the coolant in the engine (not shown) of the vehicle 11, a fuel gauge 26 for displaying the level of fuel in the fuel tank (not shown) of the vehicle 11, and turn signal lamps 20*a*, 20*b* for displaying right and left turn signals of the vehicle 11. The speedometer 22 is disposed at a center portion 19 (represented by a circular blank dot in FIG. 1) of the display of the first meter cluster panel 16. The fuel gauge 26 is disposed on the right side of the speedometer 22, and the coolant temperature gauge 24 is disposed on the left side of the speedometer 22. The turn signal lamps 20*a*, 20*b* are disposed respectively on left and right sides of the speedometer 22.

The second meter cluster panel 18 comprises a tachometer 30 for displaying engine rotational speed of the vehicle 11 as analog indications, a shift indicator 32 for displaying the speed reduction ratio of the transmission (not shown) of the vehicle 11, an odometer and trip meter 34 for displaying the mileage of the vehicle 11, and a temperature gauge 36 for displaying the temperature outside of the vehicle 11. The tachometer 30 is disposed at a center portion 21 (represented by a circular blank dot in FIG. 1) of the display of the second meter cluster panel 18. The odometer and trip meter 34 and the temperature gauge 36 are disposed in juxtaposed relation to each other below the tachometer 30. The shift indicator 32 is disposed on the right side of the tachometer 30.

As indicated by the circular blank dot, the center of display 19 of the first meter cluster panel 16 refers to the center of the display surface of the first meter cluster panel 16. As indicated by the circular blank dot, the center of display 21 of the second meter cluster panel 18 refers to the center of the display surface of the second meter cluster panel 18. The display surface of the first meter cluster panel 16 refers to a panel 17 on which the turn signal lamps 20*a*, 20*b*, the speedometer 22, the coolant temperature gauge 24, and the fuel gauge 26 are disposed. The display surface of the second meter cluster panel 18 refers to a panel 38 on which the tachometer 30, the shift indicator 32, the odometer and trip meter 34, and the temperature gauge 36 are disposed.

The height of the panel 17 of the first meter cluster panel 16, as measured in the vertical direction as shown in FIG. 1, is smaller than the height of the panel 38 of the second meter cluster panel 18.

As shown in FIG. 2, the first meter cluster panel 16 and the second meter cluster panel 18 are disposed below a V2 line 42 extending forwardly from a V2 point 40. The V2 line 42 represents a line of sight of a driver 48 from the V2 point 40, and the first meter cluster panel 16, the second meter cluster panel 18, and other vehicle-mounted devices are not disposed above the V2 line 42. The V2 line 42 thus refers to a reference line along which the frontal field of vision of all drivers 48 is not affected.

As shown in FIGS. 1 through 3, when the driver 48 who is seated on a seat 46 directs his or her line of sight 49 in the forward direction (indicated by the arrow X1) of the vehicle 11 from an eye range 37 of the driver, the first meter cluster panel 16 is visually recognized in an area of the instrument panel 14 outside of the steering wheel 12. The first meter cluster panel 16 as viewed from the perspective of the driver 48 is disposed near a boundary line 45 between the instrument panel 14 and the front windshield 44 and is included within the instrument panel 14.

Indications on the first meter cluster panel 16, i.e., indications of the speedometer 22, the fuel gauge 26, the coolant temperature gauge 24, and the turn signal lamps 20*a*, 20*b*, can thus be visually recognized outside of the steering wheel 12, within a predetermined and certain angular range of view of the driver 48.

When the driver 48 directs his or her line of sight 49 in the forward direction (indicated by the arrow X1) of the vehicle 11 from the eye range 37, the second meter cluster panel 18 is disposed in an area of the instrument panel 14 that lies inside the steering wheel 12. At this time, indications on the second meter cluster panel 18, i.e., indications of the tachometer 30, the shift indicator 32, the odometer and trip meter 34, and the temperature gauge 36, can be visually recognized inside the steering wheel 12, within a predetermined and certain angular range of view of the driver 48.

The eye range 37 shown in FIG. 2 refers to a range in which the eyes 47 of all drivers 48 who are seated on the seat 46 are positioned and are capable of visually observing an exterior area in the forward direction of the vehicle, when the line of sight 49 is directed in the forward direction of the vehicle 11, as indicated by the arrow X0, through the front windshield 44.

As shown in FIG. 1, the center of display 19 of the first meter cluster panel 16, the center of display 21 of the second meter cluster panel 18, and the center of the steering wheel 12 are positioned on a common vertical axis 39. As shown in FIG. 3, the center of display 19 of the first meter cluster panel 16, the center of display 21 of the second meter cluster panel 18, the center of the steering wheel 12, and the center of the seat 46 are positioned along a central axis 52 of the steering shaft 53, which supports the steering wheel 12 that is turned by the driver 48.

The central axis 52 extends parallel to the longitudinal direction of the vehicle 11, as indicated by the arrows X1, X2 in FIG. 3. Therefore, when view from above, the center of the steering wheel 12, the center of display 19 of the first meter cluster panel 16, the center of display 21 of the second meter cluster panel 18, and the center of the seat 46 (seat center) are disposed on the central axis 52, along the longitudinal direction of the vehicle 11 indicated by the arrows X1, X2 in FIG. 3.

As shown in FIG. 1, an upper end of the panel 17 of the first meter cluster panel 16, and a region of the instrument panel 14 near the upper end of the panel 17, are arcuate in shape along an image of the steering wheel 12 that is projected from the eye range 37 (see FIG. 2) onto the instrument panel 14.

FIG. 1 is a front elevational view of the vehicular instrument device 10 as viewed by the driver 48 (see FIG. 2) when the line of sight 49 is directed from the eyes 47 of the driver 48, within the eye range 37, in the forward direction (indicated by the arrow X1) of the vehicle 11. Therefore, the steering wheel 12, rather than the projected image of the steering wheel 12, is shown as being superposed on the instrument panel 14.

The vehicular instrument device 10 according to the present embodiment, and the vehicle 11 incorporating the vehicular instrument device 10, are basically constructed as described above. Advantages of the vehicular instrument device 10, as well as those of the vehicle 11, shall be described below with reference to FIGS. 1 through 8.

First, indications produced by the first meter cluster panel 16 and the second meter cluster panel 18, in order to allow the driver 48 (see FIGS. 2 and 3) to visually recognize required information appropriately, shall be described below with reference to FIGS. 1 through 4.

The first meter cluster panel 16 and the second meter cluster panel 18 display various items of information on the panels (display surfaces) 17, 38 thereof based on the frequency at which the information required by the driver 48 is visually recognized, while the driver 48 operates the vehicle 11.

FIG. 4 is a table showing the relationship between various meters that display items of information required by the driver 48 while the driver 48 drives the vehicle 11, and frequencies at which the meters are visually recognized by the driver 48.

In the table shown in FIG. 4, meters that are visually recognized by the driver 48 include, in a descending order of their visually recognized frequencies, the speedometer 22 (visually recognized frequency: 64%) (see FIG. 1), the tachometer 30 (15%), the odometer and trip meter 34 (10'*a*), the fuel gauge 26 (5%), the shift indicator 32 (AT indicator and parking indicator, 3%), the coolant temperature gauge 24 (1%), and the turn signal lamps 20*a*, 20*b* (turn indicators, 1%).

The items of information required by the driver include, in a descending order of their visually recognized frequencies, (1) the speed of the vehicle 11 (speedometer 22), (2) the rotational speed of the engine (tachometer 30), (3) the mileage of the vehicle 11 (odometer and trip meter 34), (4) the level of fuel in the fuel tank (fuel gauge 26), (5) the speed reduction ratio (shift indicator 32), (6) the coolant temperature (coolant temperature gauge 24), and (7) right and left turn indicators of the vehicle 11 (turn signal lamps 20*a*, 20*b*).

Therefore, if the items of information are assigned successively to the panel 17 of the first meter cluster panel 16 and to the panel 38 of the second meter cluster panel 18 in a descending order of their visually recognized frequencies, the items of information required by the driver 48 are appropriately displayed for the driver 48 so as to facilitate visual recognition thereof.

In FIG. 1, when the driver 48 (see FIGS. 2 and 3) directs his or her line of sight 49 in the forward direction (indicated by the arrow XI) of the vehicle 11, (1) the vehicle speed of the vehicle 11 which is of the highest visually recognized frequency is displayed by the speedometer 22 at the center of display 19 of the first meter cluster panel 16 which is disposed near the line of sight 49, (4) the fuel level in the fuel tank is displayed on the right side of the center of display 19 by the fuel gauge 26, (6) the coolant temperature is displayed on the left side of the center of display 19 by the coolant temperature gauge 24, and (7) the indications of right and left turns of the vehicle 11 are displayed near the center of display 19 by the turn signal lamps 20*a*, 20*b*.

The above items of information displayed by the first meter cluster panel 16 are displayed digitally. Therefore, the driver 48 can separately distinguish the displayed items of information in a short period of time. Since the speed of the vehicle 11, which has the highest visually recognized frequency, is displayed at the center of display 19 of the first meter cluster panel 16, the driver 48, who is directing his or her line of sight 49 in the forward direction (indicated by the arrow X1) of the vehicle 11, can instantaneously observe and recognize the vehicle speed.

On the other hand, (2) the engine rotational speed, which has the second highest visually recognized frequency, is displayed at the center of display 21 of the second meter cluster panel 18 by the tachometer 30, whereas (3) the mileage of the vehicle 11 is displayed below the center of display 21 by the odometer and trip meter 34, and (5) the transmission speed reduction ratio is displayed to the right of the center of display 21 by the shift indicator 32.

Since engine rotational speed, which is of the second highest visually recognized frequency, is displayed at the center of display 21 of the second meter cluster panel 18, the driver 48 directing his or her line of sight 49 in the forward direction (indicated by the arrow X1) of the vehicle 11 can visually recognize the engine rotational speed in a short period of time, by moving his or her line of sight 49 downwardly.

The first meter cluster panel 16 is disposed at a position that can easily be focused on by the driver 48, as described below with reference to FIGS. 1 through 3 and 5.

Figure 5:
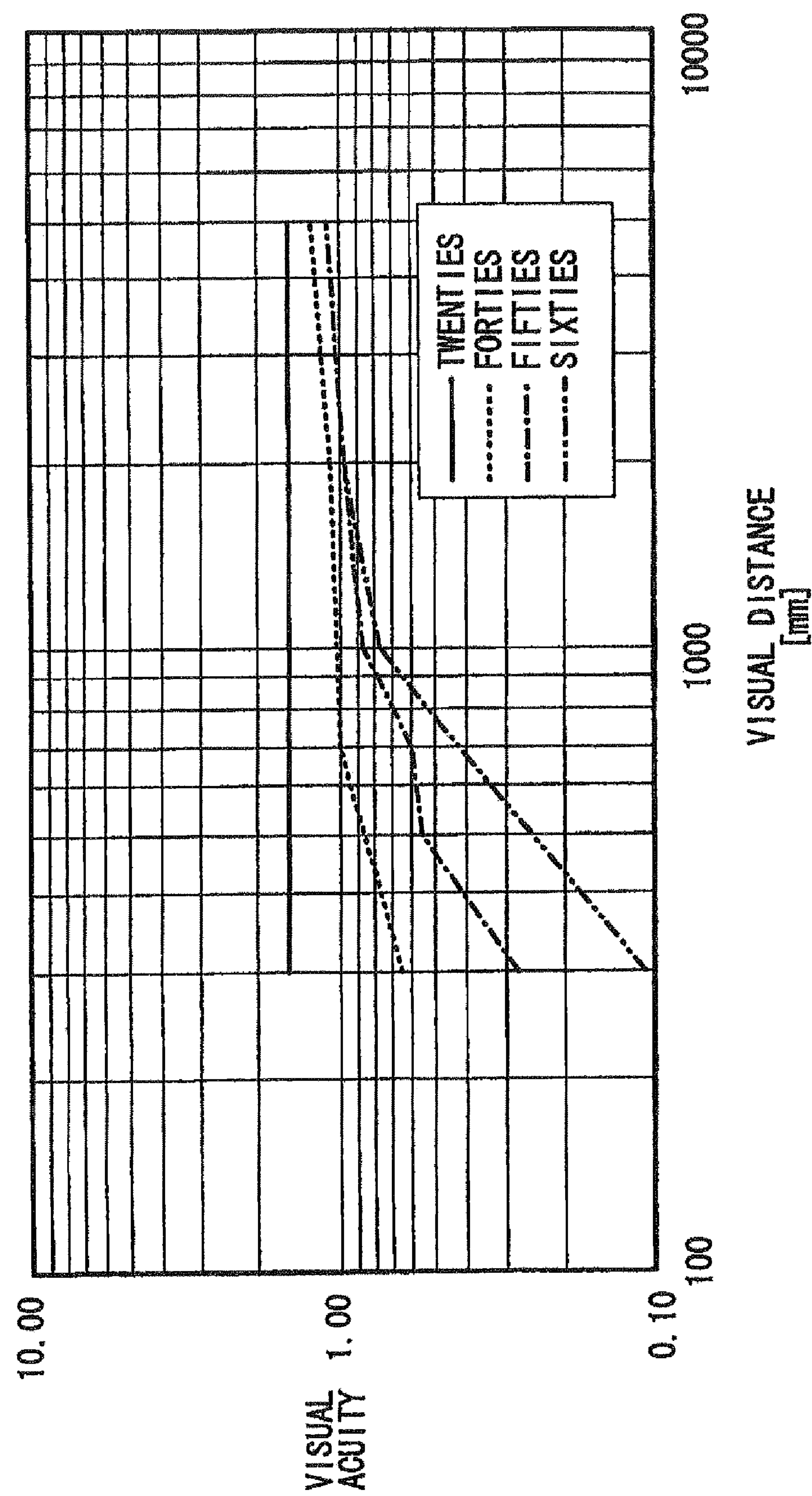
FIG. 5 is a graph showing a relationship between visual distances and visual acuity of the driver.

FIG. 5 is a graph showing the relationship between visual distances and visual acuity of the driver 48 (see FIGS. 2 and 3) who drives the vehicle 11. If the visual distances of all drivers 48 seated on the seat 46 are 1 m or more, then such drivers 48 can appropriately visually recognize the information required to drive the vehicle 11.

As shown in FIGS. 2 and 3, the first meter cluster panel 16, which displays vehicle speed having the highest visually recognized frequency, is disposed in front of the second meter cluster panel 18 in the direction indicated by the arrow XI. Therefore, if the first meter cluster panel 16 is spaced 1 m or more from the eyes 47 of the driver 48, then the driver 48 who drives the vehicle 11 can easily focus on the first meter cluster panel 16. As a result, the driver 48 can reliably visually recognize the information of high visually recognized frequency, such as the vehicle speed.

The vehicular instrument device 10 according to the present embodiment enables the line of sight 49 of the driver 48 to be moved less than the vehicular instrument device 51, according to a comparative example, as described below with reference to FIGS. 1 through 3 and 6A through 8. The vehicular instrument device 51 according to the comparative example is a conventional vehicular instrument device, which is shown in FIGS. 6A and 6B as having instruments 54 and 57.

Figure 6A:
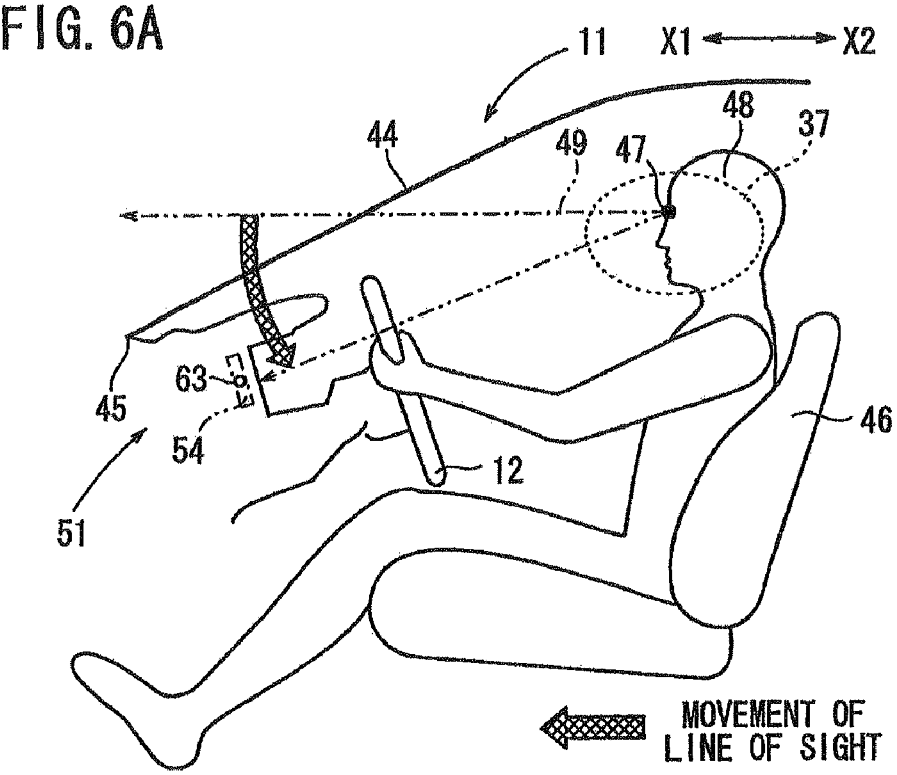
FIG. 6A is a side elevational view of a vehicular instrument device according to a comparative example.

FIG. 6A shows, in side elevation, the manner in which the line of sight 49 moves when the driver 48 views the vehicular instrument device 51. FIG. 6B shows, in front elevation, the manner in which the line of sight 49 moves when the driver 48 views the instruments 54 and 57, as well as the changes in fields of vision 56, 58 when the line of sight 49 moves.

Figure 6B:
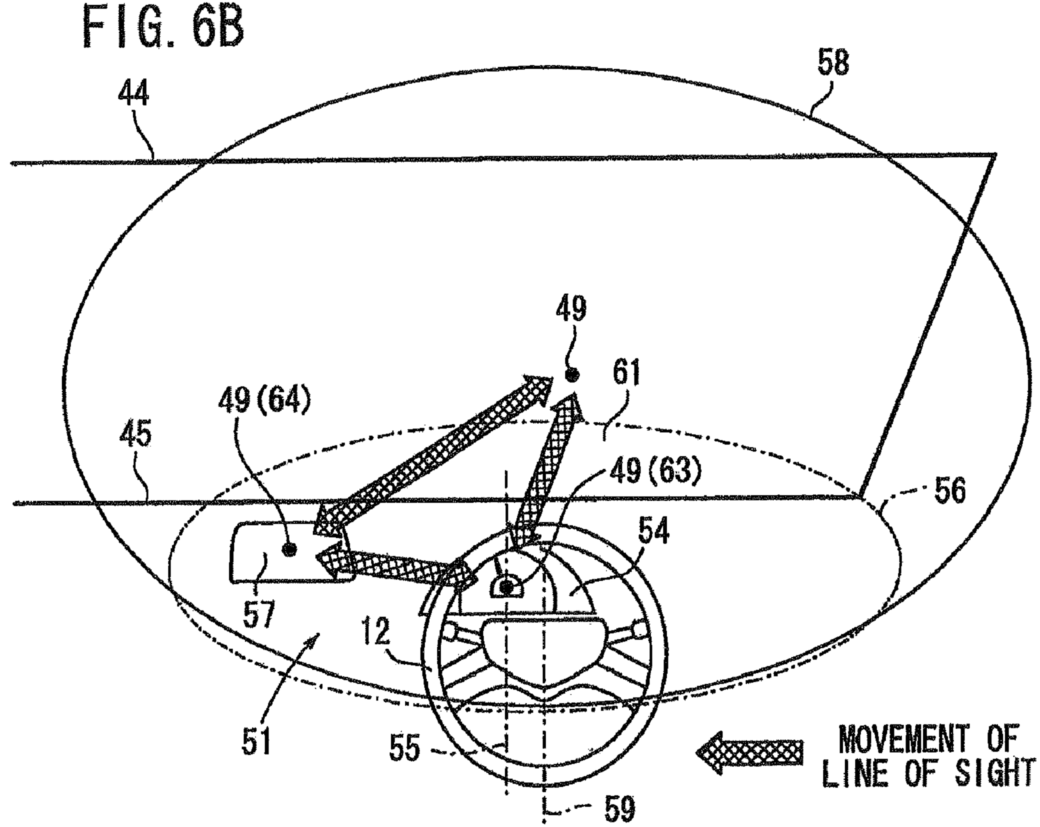
FIG. 6B is a front elevational view of the vehicular instrument device in accordance with the comparative example.

With the vehicular instrument device 51 according to the comparative example, as shown in FIGS. 6A and 6B, when the line of sight 49 is directed in the forward direction (indicated by the arrow X1) of the vehicle 11 from the eye range 37 of the driver 48, the instrument 54 is viewed within the field of vision 58 inside the steering wheel 12, whereas the instrument 57 is viewed in a central area of the instrument panel 14 outside of the steering wheel 12. The instrument 54 has a central axis 55 that is offset from a central axis 59 of the steering wheel 12 toward the central area of the instrument panel 14.

In order for the driver 48, who is seated on the seat 46, to see information such as vehicle speed displayed on the instruments 54, 57, the driver 48 must move his or her head vertically and horizontally about the neck, in order to change the line of sight 49 from the exterior area in the forward direction (indicated by the arrow X1) of the vehicle toward the instruments 54, 57.

Specifically, as shown in FIG. 6A, when the driver 48 moves his or her line of sight 49, which has been directed to the exterior area through the front windshield 44, downwardly toward the instrument 54 in order to view information, e.g., the vehicle speed, displayed on the instrument 54, then as shown in FIG. 6B, the field of vision of the driver 48 is reduced from the range indicated by 58 to the range indicated by 56. As a result, the field of vision within which the driver 48 viewing the instrument 54 can see the exterior area through the front windshield 44 is reduced to a field of vision 61 near the boundary line 45, which is defined by the dot-and-dash line representing the field of vision 56 and the solid line representing the frame of the front windshield 44.

Therefore, the driver 48, when viewing the instrument 54, is unable to have a sufficiently large field of vision with respect to the exterior area, and hence may find it difficult to recognize, in a short period of time, persons and objects that are present in the forward direction (indicated by the arrow X1) of the vehicle 11. In this case, the driver 48 needs to move his or her line of sight 49 downwardly by a large distance, from the central area of the front windshield 44 toward the instrument 54. Since the central axis 55 of the instrument 54 is offset from the central axis 59 of the steering wheel 12, the driver 48 seated on the seat 46 also is forced to drive the vehicle 11 while being kept in an unnatural driving posture.

When the driver 48 moves his or her line of sight 49, which has been directed at the center of display 63 of the instrument 54, toward the instrument 57 (see FIG. 6B) positioned to the left of the instrument 54 in order to view the information displayed on the instrument 57, since the line of sight 49 moves a greater distance horizontally than vertically, a longer period of time is required for the line of sight 49 to move horizontally than vertically.

The driver 48 is thus unable to have a proper field of vision of the exterior area, and must move his or her line of vision 49 over great distances. Further, since the instrument 57 is disposed in the central area of the instrument panel 14, the driver 48 seated on the seat 46 is forced to drive the vehicle 11 while being kept in an unnatural driving posture.

When the driver 48 moves his or her line of sight 49, which has been directed at the center of display 64 of the instrument 57, toward an obliquely upward position on the front windshield 44 (see FIGS. 6A and 6B), the driver 48 can obtain a proper field of vision of the exterior area, but needs to move the line of sight 49 a great distance.

With the vehicular instrument device 10 according to the present embodiment, as shown in FIGS. 1 through 3 and 7, the center of display 19 of the first meter cluster panel 16, the center of display 21 of the second meter cluster panel 18, the center of the steering wheel 12, the center of the steering shaft 53, and the center of the seat 46 (seat center) are coaxially positioned on the axis 39 and along the central axis 52. Consequently, when the driver 48 directs his or her line of sight 49 from the exterior area in the forward direction (indicated by the arrow X1) of the vehicle 11 toward the first meter cluster panel 16, the line of sight 49 moves only vertically. Therefore, the distance that the line of sight 49 moves is much smaller than with the vehicular instrument device 51 according to the comparative example (see FIGS. 6A and 6B).

Furthermore, the first meter cluster panel 16 that displays the speed of the vehicle 11, and which is of the highest visually recognized frequency, is disposed near the boundary line 45 at a position deeper than that of the second meter cluster panel 18 as viewed from the eye range 37 (see FIG. 2). Therefore, the vehicular instrument device 10 according to the present embodiment permits the driver 48 to focus more easily on the display surface (panel 17) of the first meter cluster panel 16 than with the vehicular instrument device 51 according to the comparative example. Consequently, the driver 48 can appropriately visually recognize the displayed information such as vehicle speed, etc.

As described above, inasmuch as the center of display 19 of the first meter cluster panel 16, the center of display 21 of the second meter cluster panel 18, the center of the steering wheel 12, the center of the steering shaft 53 (see FIG. 3), and the center of the seat 46 (seat center) are coaxially positioned on the axis 39 and along the central axis 52, the driver 48 can drive the vehicle 11 while seated in a natural driving posture observing the first meter cluster panel 16 and the second meter cluster panel 18.

Figure 7:
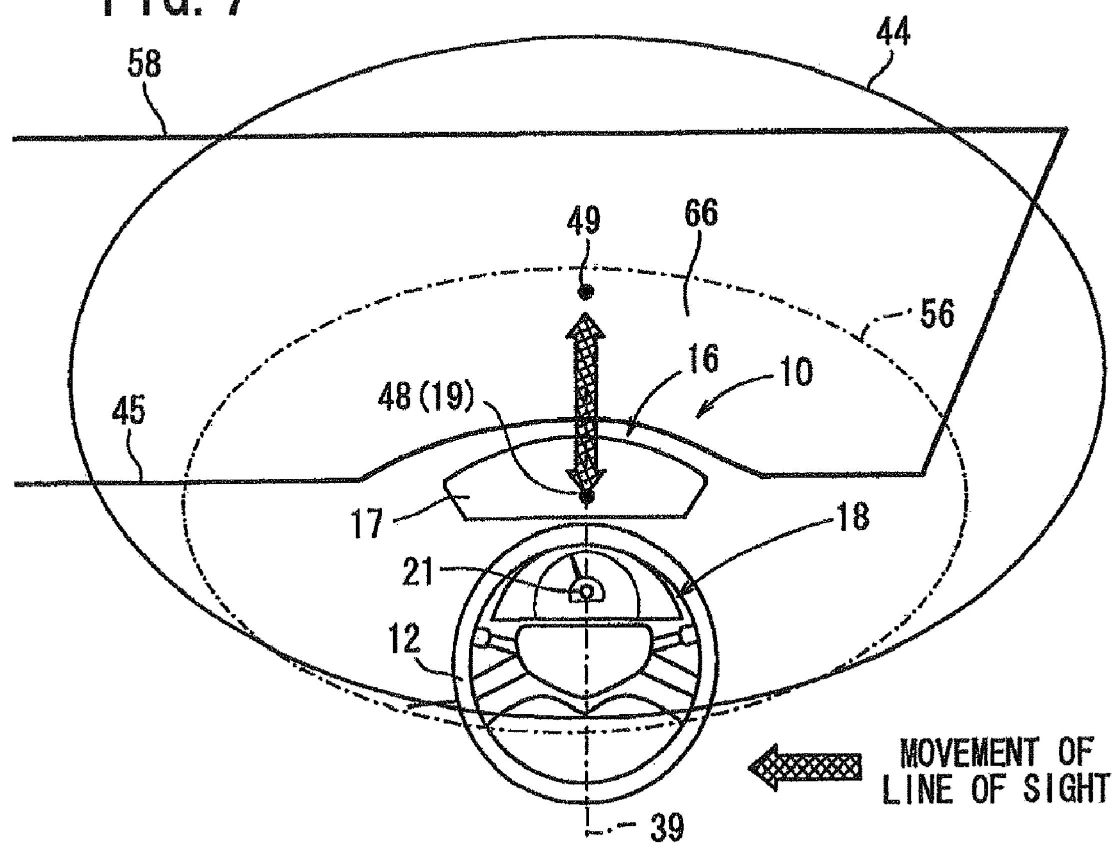
FIG. 7 is a front elevational view of the vehicular instrument device, showing manners in which the line of sight of the driver moves, and the field of vision of the driver changes.

When the driver 48 (see FIGS. 2 and 3) directs his or her line of sight 49 toward the center of display 19 of the first meter cluster panel 16, a field of vision 66, in which the driver 48 can see the exterior area through the front windshield 44, and lying inside the field of vision 56, i.e., a range defined by the dot-and-dash line representing the field of vision 56 and the solid line representing the boundary line 45, as shown in FIG. 7, is established. The established field of vision 66 is wider than the field of vision 61 in which the driver 48 (see FIG. 6A) sees the exterior area when directing his or her line of sight 49 toward the instrument 54 of the vehicular instrument device 51 according to the comparative example, i.e., a range defined by the dot-and-dash line representing the field of vision 56 and the solid line representing the boundary line 45, as shown in FIG. 6B.

Figure 8:
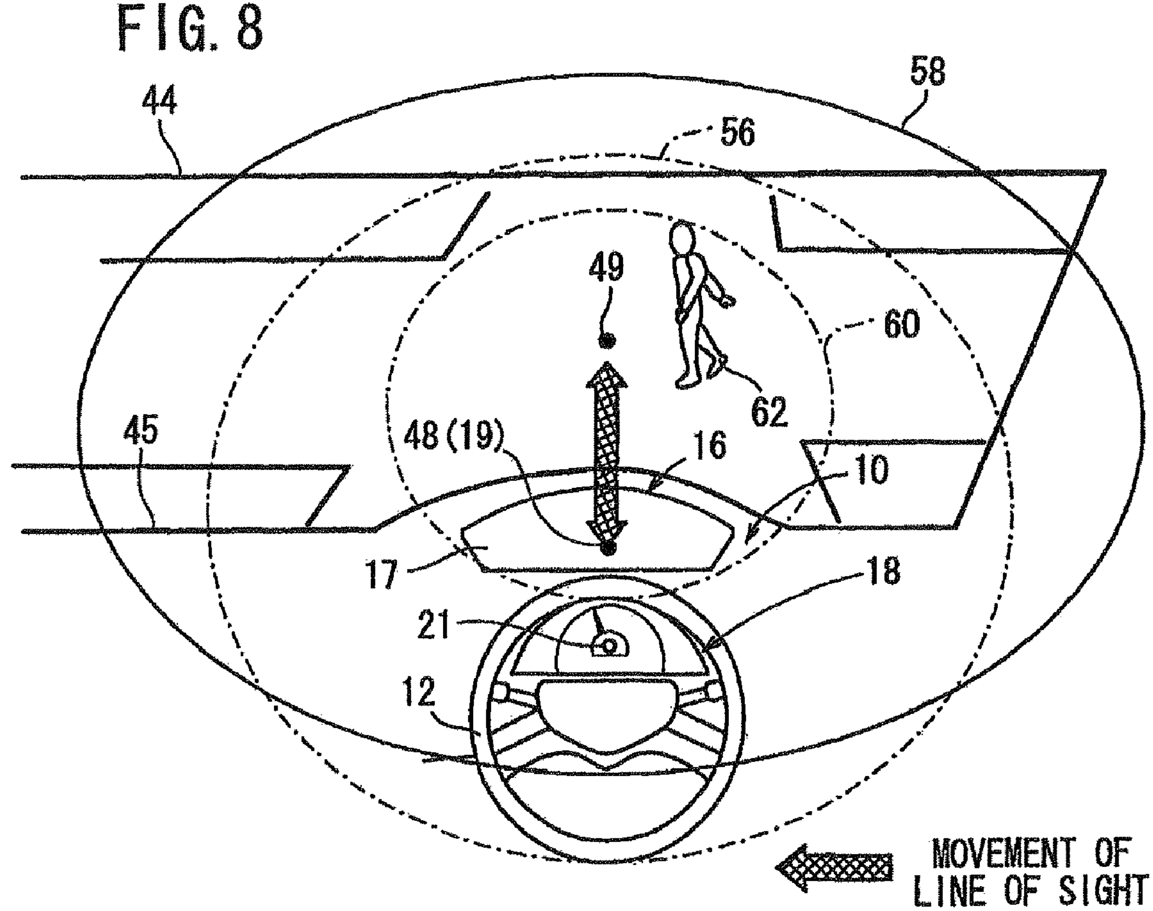
FIG. 8 is a front elevational view of the vehicular instrument device, showing a momentary field of vision of a driver looking in the forward direction of the vehicle.

Therefore, as shown in FIG. 8, the vehicular instrument device 10 according to the present embodiment allows the driver 48 to appropriately visually recognize activities in the exterior area as well as indications on the first meter cluster panel 16, within a field of vision 60 (momentary field of vision) in which the driver 48 can momentarily judge activities in the exterior area in fields of vision 56, 58, while also generally recognizing the indications on the second meter cluster panel 18 within the field of vision 56. The driver 48 can thus instantaneously recognize objects, e.g., pedestrians 62, that are present in the forward direction (indicated by the arrow X1 in FIGS. 2 and 3) while viewing the exterior area as well as the first meter cluster panel 16, and thus can quickly control the vehicle 11 in view of the presence of pedestrians 62.

The upper end of the panel 17 of the first meter cluster panel 16 is arcuate in shape along an image of the steering wheel 12 that is projected onto the instrument panel 14 when the driver 48 directs his or her line of sight 49 in the forward direction (indicated by the arrow X1) from the eye range 37 (see FIG. 2). The height of the panel 17 of the first meter cluster panel 16, as measured in the vertical direction in FIG. 1, is smaller than the height of the panel 38 of the second meter cluster panel 18.

Therefore, the driver 48 obtains a maximum field of vision with respect to the exterior area near the boundary line 45 of the front windshield 44.

With the vehicular instrument device 10 according to the present embodiment, and the vehicle 11 incorporating the vehicular instrument device 10, as described above, the line of sight of the driver 48 moves only vertically because the center of display 19 of the first meter cluster panel 16 and the center of display 21 of the second meter cluster panel 18 are disposed substantially coaxially with each other. Since the first meter cluster panel 16 is disposed at a position that is deeper than that of the second meter cluster panel 18 near the boundary line 45, and the indications on the first meter cluster panel 16 are visually recognized outside of the steering wheel 12, the driver 48 who directs his or her line of sight 49 toward the exterior area in the forward direction (indicated by the arrow X1) through the front windshield 44 can also easily focus on the display surface (panel 17) of the first meter cluster panel 16. Therefore, the vehicular instrument device 10 and the vehicle 11 according to the present embodiment enable the line of sight 49 of the driver 48 to be moved a smaller distance than in the case of the vehicular instrument device 51 according to the comparative example.

Next, a vehicular display device 114 according to an embodiment of the present invention, as well as a vehicle 110 incorporating the vehicular display device 114, shall be described below with reference to FIGS. 9 through 12C.

Figure 9:
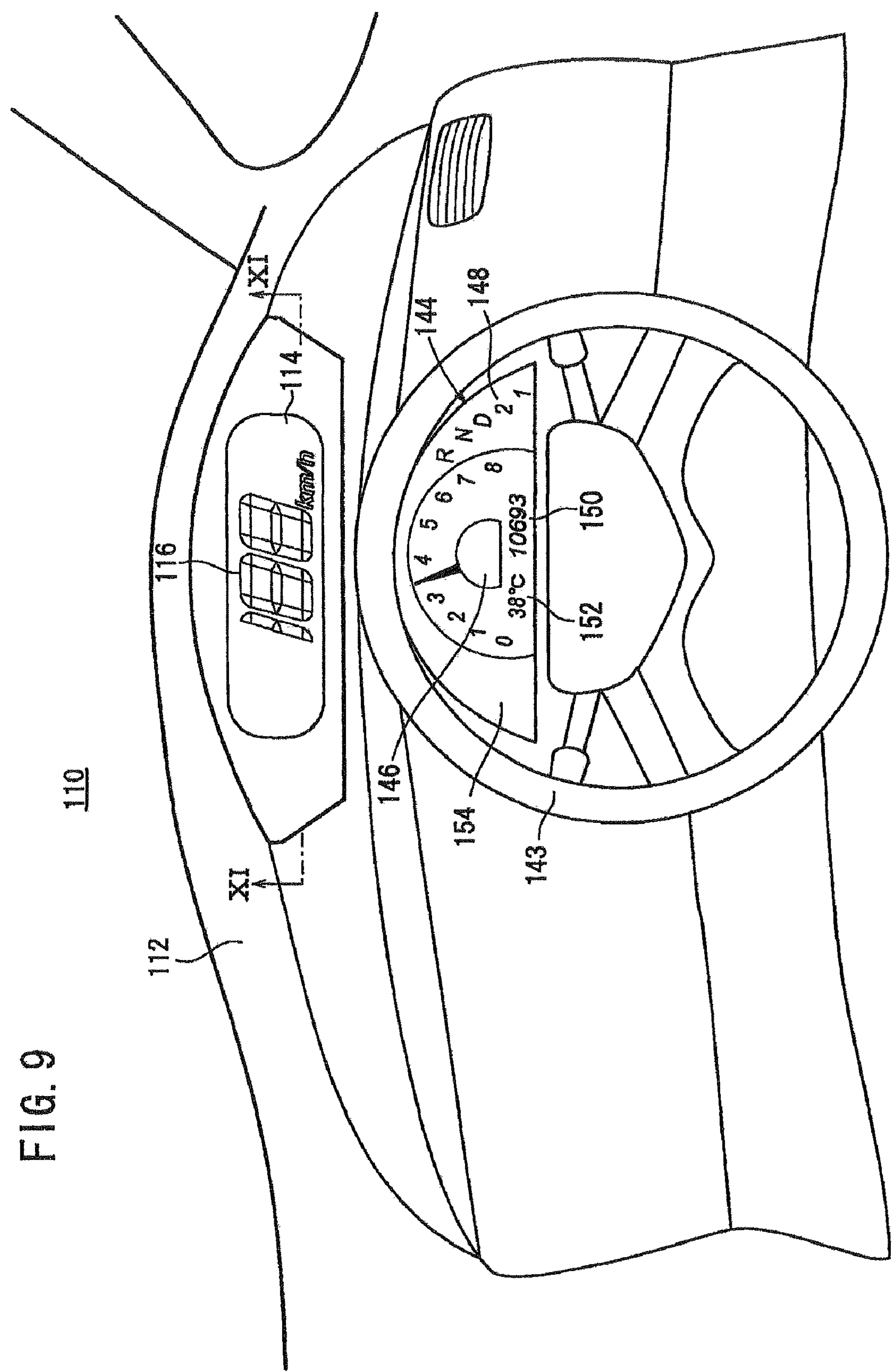
FIG. 9 is a front elevational view of a vehicular display device according to an embodiment of the present invention.
Figure 10A:
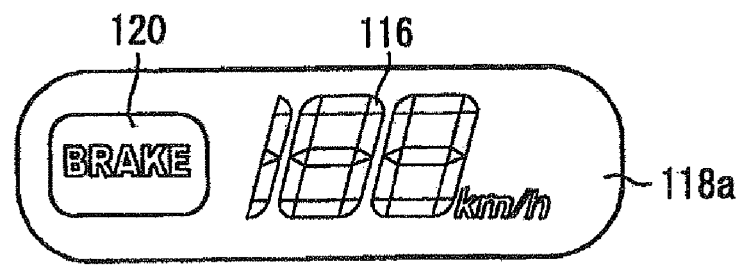
FIG. 10A is a front elevational view of a first liquid crystal display unit of the vehicular display device shown in FIG. 9.
Figure 10B:
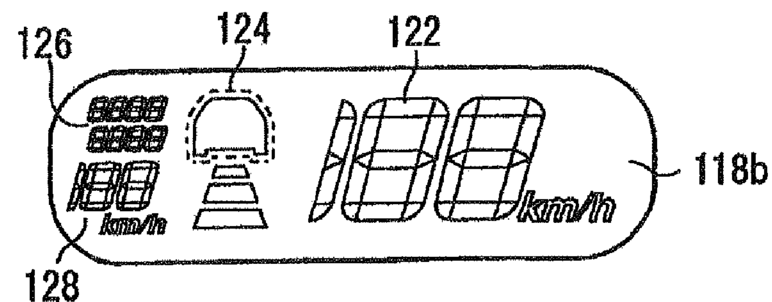
FIG. 10B is a front elevational view of a second liquid crystal display unit of the vehicular display device shown in FIG. 9.
Figure 11:
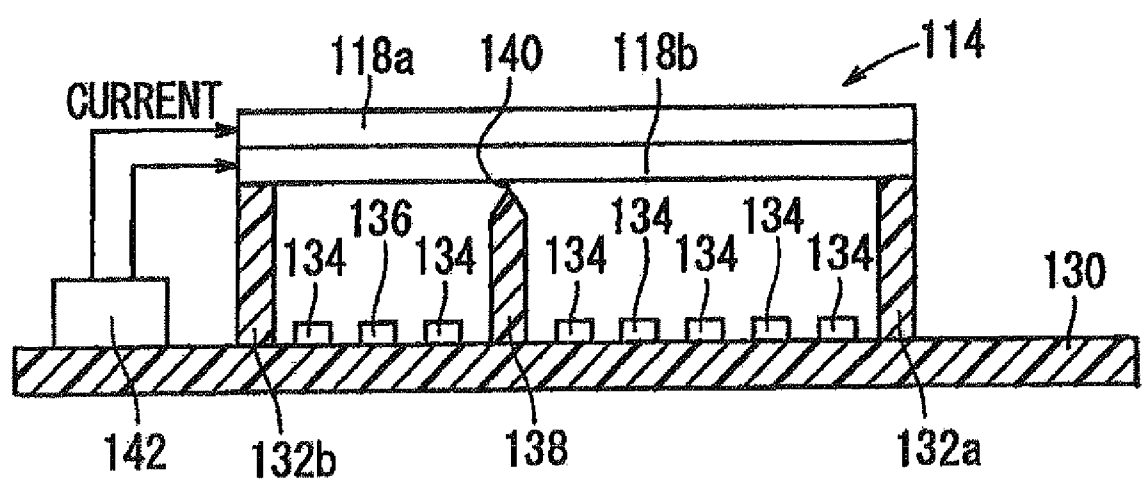
FIG. 11 is a cross-sectional view taken along line XI-XI of FIG. 9.
Figure 12A:
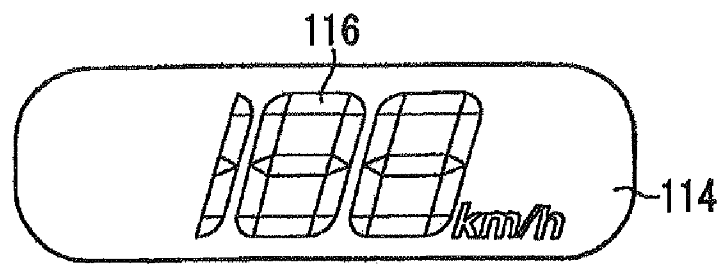
FIG. 12A is a front elevational view of a display pattern, which displays vehicle speed only.
Figure 12B:
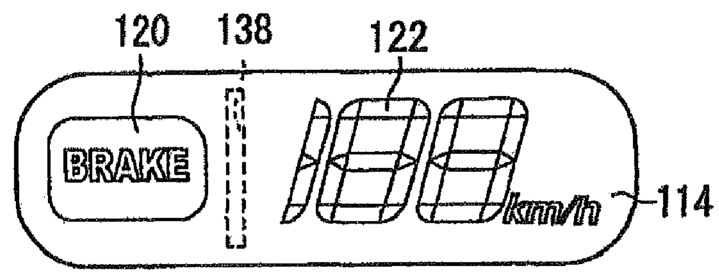
FIG. 12B is a front elevational view of a display pattern, which displays information prompting the driver to brake the vehicle.
Figure 12C:
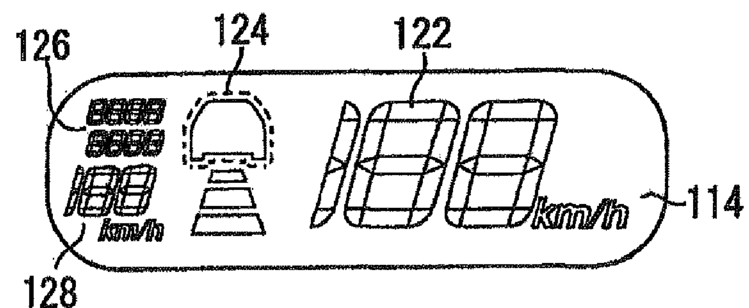
FIG. 12C is a front elevational view of a display pattern, which displays information indicating an operational state of a vehicle-mounted device (IHCC) for controlling the vehicle to cruise while keeping a predetermined distance from a preceding vehicle.

FIG. 9 shows, in front elevation, the vehicular display device 114 (also referred to as "first meter cluster panel 114") incorporated in the vehicle 110 according to the present embodiment. FIGS. 10A and 10B show, in front elevation, the display surfaces of a first liquid crystal display unit 118*a* and a second liquid crystal display unit 118*b*, respectively, of the first meter cluster panel 114. FIG. 11 is a cross-sectional view of the first meter cluster panel 114 shown in FIG. 9, taken along line XI-XI of FIG. 9. FIGS. 12A through 12C show, in front elevation, display patterns on the first meter cluster panel 114.

As shown in FIG. 9, the first meter cluster panel 114 is disposed on an upper portion of an instrument panel 112 and outside of the steering wheel 143 as viewed by the driver of the vehicle 110 (not shown). As shown in FIGS. 10A through 11, the first meter cluster panel 114 comprises a planar first liquid crystal display unit 118*a*, and a planar second liquid crystal display unit 118*b* that is superposed on the first liquid crystal display unit 118*a*.

The first liquid crystal display unit 118*a* is disposed closer to the driver, and comprises, as shown in FIG. 10A, a display element 116 positioned centrally in the first liquid crystal display unit 118*a*, and a display element 120 disposed on the left side of the display element 116. The display element 116 displays the speed of the vehicle 110. The display element 120 displays information for indicating to the driver of the vehicle 110 that the vehicle 110 is approaching a preceding vehicle, which is driven in front of the vehicle 110.

Specifically, the vehicle 110 incorporates therein a vehicle-mounted device (hereinafter referred to as an "IHCC (Intelligent Highway Cruise Control) system" for controlling the vehicle 110 to cruise, while maintaining a predetermined distance between the vehicle 110 and the preceding vehicle. The IHCC system detects, using radar, the actual vehicle-to-vehicle distance between the vehicle 110 and the preceding vehicle, and outputs various items of information, indicating that the vehicle 110 is approaching the preceding vehicle, to the first meter cluster panel 114 when the detected actual vehicle-to-vehicle distance is shorter than a vehicle-to-vehicle distance preset in the IHCC system.

In FIG. 10A, the display element 120 displays a message "BRAKE" for prompting the driver to brake the vehicle 110 when the vehicle 110 approaches too closely to the preceding vehicle.

As shown in FIG. 10B, the second liquid crystal display unit 118*b* comprises a display element 122 disposed in a right side area of the display surface of the second liquid crystal display unit 118*b*, a display element 124 disposed to the left of the display element 122, and display elements 126, 128 disposed to the left of the display element 124.

The display element 122 displays vehicle speed, and the display element 124 displays information concerning whether the IHCC system in operation has detected the preceding vehicle or not. The display element 126 displays (1) information of whether the IHCC system is in operation, (2) information of whether the vehicle 110 is approaching a preceding vehicle, and (3) information of whether a radar transmitting/receiving unit is dirty or smeared and thus is incapable of detecting the preceding vehicle. The display element 128 displays a preset vehicle speed when the IHCC system is in operation.

Each of the display elements 116 and 120 through 128 comprises a transmissive liquid crystal display element for displaying digital information. The display elements 116, 122, the display element 126, and the display element 128 for displaying preset vehicle speed, comprise segmented liquid crystal display elements.

If each of the display elements 116 and 120 through 128 comprises a TN liquid crystal display element, when a controller 142 (see FIG. 11) energizes LEDs 134, 136 to emit light, while also energizing the display elements 116 and 120 through 128, light emitted from the LEDs 134, 136 is blocked by the display elements 116 and 120 through 128. As a result, the driver observing the first meter cluster panel 114 is unable to visually recognize indications on the display elements 116 and 120 through 128.

When the controller 142 energizes LEDs 134, 136 to emit light, while de-energizing the display elements 116 and 120 through 128, light emitted from the LEDs 134, 136 is transmitted through the display elements 116 and 120 through 128 and is radiated outwardly. Therefore, the driver observing the first meter cluster panel 114 is able to visually recognize indications on the display elements 116 and 120 through 128.

In the first meter cluster panel 114, the speed of the vehicle 110 is displayed as first information indicative of a status of the vehicle 110 by the display elements 116, 122. The information (1), the information (3), and the preset vehicle speed are displayed as second information for confirming operational settings of the IHCC system by the display elements 126, 128. Information indicating that the vehicle 110 is approaching a preceding vehicle, information indicating that the IHCC system has detected the preceding vehicle, and the above-described information (2), are displayed as third information given to the driver by the display elements 120, 124, 126.

As shown in FIG. 11, the first liquid crystal display unit 118*a* and the second liquid crystal display unit 118*b* are fixedly mounted onto a baseboard 130 by support members 132*a*, 132*b*. A plurality of LEDs 134 for emitting white light, and an LED 136 for emitting amber light, are disposed on the surface of the baseboard 130 inside of the support members 132*a*, 132*b*. A wall 138 extends from the baseboard 130 to the second liquid crystal display unit 118*b*, with a clearance 140 remaining between the tip end of the wall 138 and the second liquid crystal display unit 118*b*.

As shown in FIG. 11, some of the LEDs 134 are positioned on the right side of the wall 138, and other LEDs 134, and the LED 136, are positioned on the left side of the wall 138. As shown in FIG. 12B, the wall 138 divides the display element 120 and the display element 122 from each other, as viewed from the second liquid crystal display unit 118*b* (see FIG. 11) toward the baseboard 130.

When the controller 142 energizes the TN display elements 116 and 124 through 128 (see FIGS. 10A and 10B), while also energizing the LEDs 134 on the right side of the wall 138 and the LED 136 on the left side of the wall 138, white light emitted from the LEDs 134 on the right side of the wall 138 passes only through the display element 122 and is radiated outwardly, and amber light emitted from the LED 136 on the left side of the wall 138 passes only through the display element 120 and is radiated outwardly. As a result, the display element 116 displays "100 km/h", for example, in white characters, while the display element 120 displays "BRAKE", for example, in amber characters. Therefore, the first meter cluster panel 114 displays the display pattern shown in FIG. 12B.

The driver can thus recognize that the present speed of the vehicle 110 is 100 km/h, and that the vehicle 110 needs to be braked, because the vehicle 110 is approaching a preceding vehicle.

Since the wall 138 is disposed between the LEDs 134 that emit white light and the LED 136 that emits amber light, white light emitted from the LEDs 134 is prevented from passing through the display element 120, while amber light emitted from the LED 136 is prevented from passing through the display element 122.

As shown in FIG. 11, the controller 142 is disposed on the surface of the baseboard 130 outside of the support member 132*b*. The controller 142 controls energization of the display elements 116 and 120 through 128 (see FIGS. 10A and 10B), as well as energization of the LEDs 134, 136, such that the display elements 116, 120 and 122 through 128 simultaneously display the first information, and the second information or the third information, which are required by the driver of the vehicle 110, in a non-overlapping manner.

Specifically, the controller 142 controls the display elements 116 and 120 through 128 (see FIGS. 10A and 10B), as well as the LEDs 134, 136 (see FIG. 11), in order to display the display patterns shown in FIGS. 12A through 12C, for example.

FIG. 12A shows a display pattern, which displays only the vehicle speed as first information on the display element 116. FIG. 12B shows a display pattern, which displays the vehicle speed as first information on the display element 122, and also displays information for prompting the driver to brake the vehicle 110 as third information on the display element 120. FIG. 12C shows a display pattern, which displays the vehicle speed as first information on the display element 122, displays information indicating that the vehicle 110 is approaching a preceding vehicle as third information on the display element 124, and also displays the preset vehicle speed for the vehicle 110 on the display element 128.

A comparison of FIGS. 12A through 12C reveals that the vehicle speed, serving as the first information, is displayed in a large size in FIG. 12A, but is displayed in a small size in FIGS. 12B and 12C, so as not to overlap the second information and third information. In FIGS. 12B and 12C, the first information, together with the second information or the third information, are disposed next to each other.

As shown in FIG. 9, a second meter cluster panel 144 is also disposed on the instrument panel 112. The second meter cluster panel 144 is positioned inside of a steering wheel 143 as viewed from the perspective of the driver. The second meter cluster panel 144 comprises a tachometer 146 disposed centrally on the display surface, for displaying engine rotational speed of the vehicle 110 as analog indications, a shift indicator 148 for displaying the speed reduction ratio of the transmission (not shown) of the vehicle 110, an odometer and trip meter 150 for displaying mileage of the vehicle 110, and a temperature gauge 152 for displaying the temperature outside of the vehicle 110. The tachometer 146 is disposed centrally on a panel 154, which serves as the display surface of the second meter cluster panel 144. The odometer and trip meter 150, and the temperature gauge 152, are disposed in juxtaposed relation to each other below the tachometer 146. The shift indicator 148 is disposed on the right side of the tachometer 146.

The vehicular display device (first meter cluster panel) 114 according to the present embodiment, and the vehicle 110 which incorporates the vehicular display device 114 therein, are basically constructed as described above. Operations of the vehicular display device (first meter cluster panel) 114, along with the vehicle 110, shall be described below with reference to FIGS. 9 through 12C.

Operations of the first meter cluster panel 114, for changing indications on the first meter cluster panel 114 from the display pattern shown in FIG. 12A to the display pattern shown in FIG. 12B or 12C when the vehicle-to-vehicle distance between the vehicle 110 and the preceding vehicle becomes smaller than the preset distance in the IHCC system, shall be described below. It is assumed that each of the display elements 116 and 120 through 128 comprises a TN liquid crystal display element.

First, operation of the first meter cluster panel 114, for displaying the display pattern shown in FIG. 12A, i.e., operation of the first meter cluster panel 114 when the vehicle-to-vehicle distance between the vehicle 110 and the preceding vehicle is the preset distance in the IHCC system, shall be described below.

The controller 142 (see FIG. 11) energizes the display elements 120 through 128 (see FIGS. 10A and 10B) while also energizing all of the LEDs 134 on the baseboard 130. White light emitted from the LEDs 134 passes through only the display element 116 and is radiated outwardly. The display element 116 displays "100 km/h", for example, in white characters. As a consequence, the driver can recognize that, the current speed of the vehicle 110 is 100 km/h.

Next, operation of the first meter cluster panel 114, while the IHCC system is in operation, for changing indications on the first meter cluster panel 114 from the display pattern shown in FIG. 12A to the display pattern shown in FIG. 12B, when the vehicle-to-vehicle distance between the vehicle 110 (see FIG. 9) and the preceding vehicle becomes smaller than the preset distance in the IHCC system, shall be described below.

The IHCC system judges that the vehicle speed needs to be lowered, and that the vehicle-to-vehicle distance needs to be increased up to the preset distance. The IHCC system outputs a signal to the controller 142 for prompting the driver to brake the vehicle 110 (see FIG. 11). Based on the input signal, the controller 142 energizes the LEDs 134 on the right side of the wall 138 as well as the LED 136 on the left side of the wall 138, while also energizing the display elements 116 and 124 through 128 (see FIGS. 10A and 10B).

White light emitted from the LEDs 134 on the right side of the wall 138 passes only through the display element 122 and is radiated outwardly. The display element 122 displays "100 km/h", for example, in white characters. Amber light emitted from the LED 136 on the left side of the wall 138 passes only through the display element 120 and is radiated outwardly. The display element 120 displays "BRAKE", for example, in amber characters. As a result, the driver can recognize that the current speed of the vehicle 110 is 100 km/h and that the vehicle 110 needs to be braked because the vehicle 110 is approaching the preceding vehicle.

Now, operation of the first meter cluster panel 114, while the IHCC system is in operation, for changing indications on the first meter cluster panel 114 from the display pattern shown in FIG. 12A to the display pattern shown in FIG. 12C, so as to inform the driver that the preceding vehicle is running ahead of the vehicle 110 (see FIG. 9), shall be described.

The IHCC system outputs a signal to the controller 142 indicating that the IHCC system is in operation, and that the preceding vehicle is running ahead of the vehicle 110 (see FIG. 11). Based on the input signal, the controller 142 energizes all of the LEDs 134 while also energizing the display elements 116, 120 (see FIG. 10A).

White light emitted from the LEDs 134 passes only through the display elements 122 through 128 and is radiated outwardly. The display element 122 displays "100 km/h", for example, in white characters. The display element 124 displays a vehicle figure, representing the preceding vehicle, in white. The display element 128 displays "100 km/h" as the preset vehicle speed in the IHCC system in white characters. As a result, the driver can recognize that (1) the present speed of the vehicle 110 is 100 km/h, (2) the preceding vehicle is running ahead of the vehicle 110, (3) the IHCC system is in operation, and (4) the preset speed of the vehicle 110 in the IHCC system is 100 km/h.

As described above, the vehicular display device (first meter cluster panel) 114 according to the present embodiment, and the vehicle 110 that incorporates the vehicular display device 114, simultaneously display the first information together with the second information or the third information in a non-overlapping manner. Even when various items of information are displayed, movement of the driver's line of sight is kept relatively small.

The display element 116 of the first liquid crystal display unit 118*a* and the display element 122 of the second liquid crystal display unit 118*b*, which display the first information (vehicle speed), are of different sizes. While the vehicle speed is being displayed by the display element 116 of the first liquid crystal display unit 118*a*, and when the display elements 120 and 124 through 126 are operated to display the second information or the third information, the controller 142 controls the display elements 116 and 120 through 128 together with the LEDs 134, 136 in order to display the vehicle speed on the display element 122. The display element 122 for displaying vehicle speed is smaller in size than the display element 116 for displaying vehicle speed. The display elements 116 and 120 through 128 can thus be arranged to display the first, second, and third information, without having to increase the liquid crystal display sizes of the first liquid crystal display unit 118*a* and the second liquid crystal display unit 118*b*.

When the first, information, along with the second information or the third information, are displayed simultaneously by the first liquid crystal display unit 118*a* and the second liquid crystal display unit 118*b*, the controller 142 controls the display elements 116 and 120 through 128 in order to display the first information, together with the second information or the third information, next to each other. Therefore, movement of the driver's line of sight is further reduced.

The display elements 116 and 120 through 128 can display other characters and figures, as described below, as well as the characters and figures that have been described above. The display element 124 can display a figure indicating that the IHCC system has not detected a preceding vehicle. The display element 126 can display characters "CMS NEAR" indicating that the vehicle 110 is approaching the preceding vehicle and could possibly hit the preceding vehicle from behind, characters "CMS FAR" indicating that the vehicle 110 is approaching the preceding vehicle, but is not close enough to hit the preceding vehicle from behind, characters "IHCC OFF" indicating that the IHCC system is not in operation, and characters "RADAR SMEARED" indicating that the transmitting/receiving unit of the radar has become dirty or smeared and thus is incapable of detecting a preceding vehicle.

The display elements 116 and 120 through 128 have been described as comprising segmented liquid crystal display elements. However, the display elements may also comprise dot-matrix liquid crystal display elements. In the above description, the LEDs 134 emit white light and the LED 136 emits amber light. However, the LEDs may be replaced with different LEDs that emit light in other colors.

Although certain preferred embodiments of the present invention have been shown and described in detail, it should be understood that various changes and modifications may be made therein without departing from the scope of the appended claims.

The invention claimed is:

1. A vehicular display device comprising:

a transmissive first liquid crystal display unit having a plurality of display elements;

a transmissive second liquid crystal display unit superposed on said first liquid crystal display unit and having a plurality of display elements; and a controller for controlling said display elements of said first liquid crystal display unit and said display elements of said second liquid crystal display unit, so as to display information required by a driver of the vehicle, wherein the information displayed by said display elements comprises at least first information indicative of a status of said vehicle, second information for confirming an operating setting of a vehicle-mounted device on said vehicle, and third information for indication to said driver, and wherein said controller controls said display elements to selectively display said information by selectively energizing and de-energizing said display elements, and further controls said display elements to simultaneously display the information in a non-overlapping manner.

2. A vehicular display device according to claim 1, wherein the display element of said first liquid crystal display unit and the display element of said second liquid crystal display unit have respective different sizes for displaying said first information, wherein while said first information is being displayed by the display element of either one of said first liquid crystal display unit and said second liquid crystal display unit, when said second information or said third information is displayed by the display element of the other one of said first liquid crystal display unit and said second liquid crystal display unit, said controller controls said display elements so as to display said first information on the display element of said other liquid crystal display unit, and wherein the display element of said other liquid crystal display unit for displaying said first information is smaller in size than the display element of said one liquid crystal display unit for displaying said first information.

3. A vehicular display device according to claim 1, wherein when said first information, and said second information or said third information, are simultaneously displayed by said first liquid crystal display unit and said second liquid crystal display unit, said controller controls said display elements to display the information next to each other as viewed from the perspective of said driver.

4. A vehicle incorporating therein the vehicular display device according to claim 1.

* * * * *